June 27, 1967  M. J. MAIER  3,327,881
DUAL THERMAL BOTTLE
Filed Nov. 8, 1965
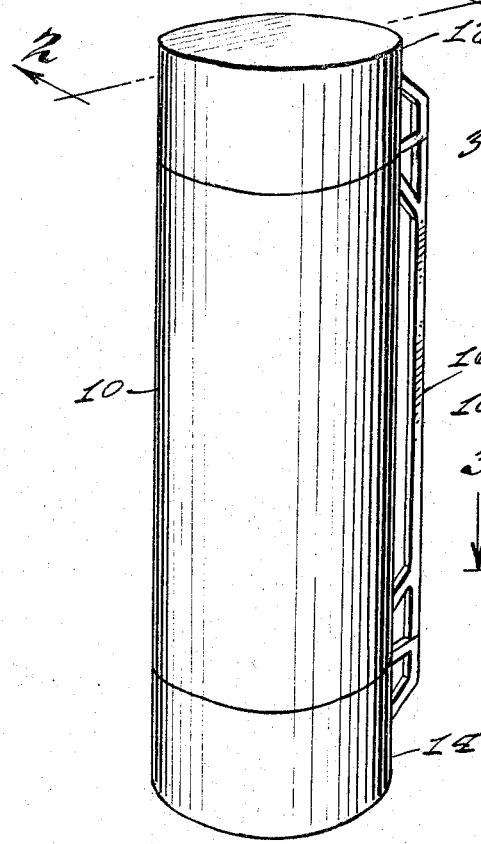
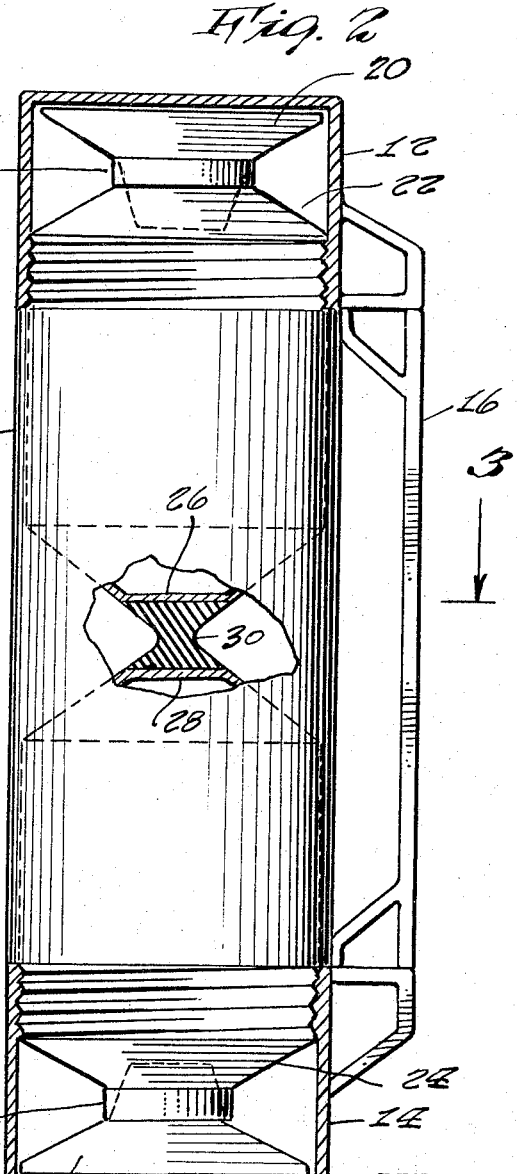
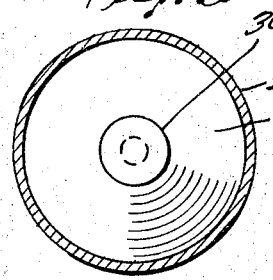
INVENTOR
MILDRED J. MAIER United States Patent Office 3,327,881
Patented June 27, 1967

3,327,881
DUAL THERMAL BOTTLE
Mildred J. Maier, 650 Pine Forest Drive, Apt. 201,
East Lansing, Mich. 48823
Filed Nov. 8, 1965, Ser. No. 506,658
5 Claims. (Cl. 215—6)

My invention is directed toward thermal bottles adapted for receiving liquids either hot or cold and for keeping said liquid at temperature for a desired period because of the thermal storage characteristics of the bottle.

Accordingly, it is an object of my invention to provide a new and improved thermal bottle having means adapted to separately store liquid in two separate compartments, whereby different liquids, or liquids at different temperatures can be carried in a common container.

Another object of my invention is to provide a new and improved multi-compartment thermal bottle of the character indicated which can be manufactured easily and inexpensively.

All of the foregoing and still further objects and advantages of my invention will now be explained with reference both to this specification and to the accompanying drawings wherein:

FIGURE 1 is a perspective view of my invention;

FIGURE 2 is a side view thereof partially in cross-section; and

FIGURE 3 is a cross-section through 3—3 of FIGURE 2.

Referring now to FIGURES 1–3, there is shown a hollow insulated cylindrical container 10 having top and bottom screwable removable end caps 12 and 14, and having a carrying handle 16.

Each end cap when removed, exposes a corresponding removable plastic stopper 18 or 20 inserted in the mouth 32 or 34 of a corresponding upper or lower vacuum bottle 22 or 24. Each stopper is bell shaped so that the container can stand on either end with the end cap in place or removed. The ends of the bottles opposite the mouth taper downward to a small flat one as 26 or 28 which are interconnected by a rubber bumper 30 to prevent the two bottles from shifting in position or touching each other. Caps 12 and 14 can be of different colors to identify the separate bottles. Obviously a hot liquid can be stored in one bottle and a cold liquid in the other, or the same or different liquids can be stored at the same or different temperatures in the two bottles.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. A device for thermally storing liquids comprising a hollow vertical cylinder having upper and lower removable end caps engaging the upper and lower ends thereof, upper and lower hollow vacuum bottles in said cylinder, each bottle having an open mouth and a flat opposite end, the mouth of the upper bottle being positioned adjacent the upper cap, the mouth of the lower bottle being positioned adjacent the lower cap, the flat ends of said bottles being disposed adjacent each other in the middle of the cylinder, and means disposed between said flat ends to support and separate said bottles, said means being separate and completely spaced from the cylinder.

2. A device as set forth in claim 1, further including first and second removable stoppers, each stopper being inserted in the mouth of the corresponding bottle.

3. A device as set forth in claim 1, wherein said means is a rubber bumper.

4. A device as set forth in claim 1, wherein said caps are of different colors.

5. A device as set forth in claim 2, wherein each stopper has a bell shape.

References Cited
UNITED STATES PATENTS

| | | | |
|---|---|---|---|
| 1,001,850 | 8/1911 | Hubert | 215—12 |
| 1,549,269 | 8/1925 | Koree | 214—13 X |
| 2,099,174 | 11/1937 | Payson | 220—16 X |
| 2,833,436 | 5/1958 | Ruderian | 215—13 X |
| 2,836,323 | 5/1958 | Robinson | 215—6 X |

JOSEPH R. LECLAIR, Primary Examiner.
D. F. NORTON, Assistant Examiner.